(12) United States Patent
Roux et al.

(10) Patent No.: US 12,392,691 B2
(45) Date of Patent: Aug. 19, 2025

(54) DEVICE FOR COLLECTING AND ANALYZING AIRBORNE PARTICLES

(71) Applicant: Commissariat à l'Energie Atomique et aux Energies Alternatives, Paris (FR)

(72) Inventors: Jean-Maxime Roux, Grenoble (FR); Manuel Alessio, Grenoble (FR); Melissa Baque, Grenoble (FR); Raphaël Trouillon, Grenoble (FR)

(73) Assignee: Commissariat à l'Energie Atomique et aux Energies Alternatives, Paris (FR)

( * ) Notice: Subject to any disclaimer, the term of this patent is extended or adjusted under 35 U.S.C. 154(b) by 534 days.

(21) Appl. No.: 17/645,328

(22) Filed: Dec. 21, 2021

(65) Prior Publication Data

US 2022/0196521 A1    Jun. 23, 2022

(30) Foreign Application Priority Data

Dec. 21, 2020   (FR) ...................................... 20 13772

(51) Int. Cl.
*G01N 1/28* (2006.01)
*B03C 3/45* (2006.01)
*G01N 1/22* (2006.01)

(52) U.S. Cl.
CPC ............. *G01N 1/2813* (2013.01); *B03C 3/45* (2013.01); *G01N 1/2202* (2013.01)

(58) Field of Classification Search
CPC .............. G01N 1/2813; G01N 1/2202; G01N 2001/4038; G01N 2001/4061; G01N 1/28; G01N 1/22; B03C 3/45; B03C 3/32; B03C 3/16; B03C 3/53; B03C 3/78; B03C 3/34; B03C 3/86; B03C 3/84; B03C 3/88; Y02A 20/00
(Continued)

(56) References Cited

U.S. PATENT DOCUMENTS

| 6,231,643 B1 * | 5/2001 | Pasic | ........................ B03C 3/76 96/36 |
| 2004/0083790 A1 * | 5/2004 | Carlson | ................ G01N 1/2273 96/49 |

(Continued)

FOREIGN PATENT DOCUMENTS

| CN | 105413871 A * | 3/2016 |
| EP | 1 112 124 B1 | 3/2007 |

(Continued)

OTHER PUBLICATIONS

French Preliminary Search Report issued Sep. 8, 2021 in French Application 20 13772 filed on Dec. 21, 2020, 11 pages (with English Translation of Categories of Cited Documents & Written Opinion).

*Primary Examiner* — Qianping He
(74) *Attorney, Agent, or Firm* — Oblon, McClelland, Maier & Neustadt, L.L.P.

(57) ABSTRACT

A device for collecting particles present in a gas or gas mixture, including a component, a collection zone disposed on the component, on which said particles are deposited, collection device configured to force said particles to be deposited against the collection zone, a fluidic elution circuit arranged in said component to elute the particles present in the collection zone.

13 Claims, 6 Drawing Sheets

(58) Field of Classification Search
USPC .............................................................. 96/66
See application file for complete search history.

(56) References Cited

U.S. PATENT DOCUMENTS

| | | | | |
|---|---|---|---|---|
| 2008/0295687 A1* | 12/2008 | Galbrun | .................... | B03C 3/16 |
| | | | | 95/59 |
| 2010/0000540 A1 | 1/2010 | Pouteau et al. | | |
| 2012/0174650 A1* | 7/2012 | Ariessohn | ................. | B03C 3/41 |
| | | | | 73/23.2 |
| 2021/0102265 A1* | 4/2021 | Wu | ......................... | C12Q 1/70 |

FOREIGN PATENT DOCUMENTS

| | | | | |
|---|---|---|---|---|
| FR | 3051377 A1 | * | 11/2017 | ............... B03C 3/49 |
| JP | S62176559 A | * | 8/1987 | |

* cited by examiner

DEVICE FOR COLLECTING AND ANALYZING AIRBORNE PARTICLES

TECHNICAL FIELD OF THE INVENTION

The present invention relates to a device for collecting and analyzing particles dispersed in an aerosol, and to a collection and analysis method implemented using the device.

STATE OF THE ART

Several solutions have already been proposed in the state of the art for collecting particles present in an aerosol.

The collection of the particles present in an aerosol can notably be performed for the purposes of analysis.

One known and particularly advantageous separation method is of electrostatic type. It is implemented in electrostatic collectors, also called electrostatic precipitators or even electrostatic filters (ESP for "electrostatic precipitator").

There are several categories of electrostatic collectors, including:
- the so-called dry electrostatic collectors, for example described in the patent application WO2015/197747A1,
- the so-called wet electrostatic collectors, for example described in the patent application WO2004/041440A1,
- the so-called semi-wet electrostatic collectors, for example described in WO2007/012447A1.

In all these categories, the collectors comprise a chamber into which a stream of air containing particles is injected or sucked, and generate an electrical field between two electrodes, a discharge electrode and a so-called collection counter-electrode, which, as a general rule, is linked to the ground.

In the first category of the so-called dry electrostatic collectors, also called electrofilters, the electrical field created between the two electrodes generates a flow of ions from an ionized gas pocket surrounding the discharge electrode. The flow of air containing the particles is injected through the flow of ions. In the presence of ions, the particles acquire electrical charges and thus become sensitive to the electrical field generated between the two electrodes and are driven by the electrical force to the counter-electrode. The collected particles are detached from the collection electrodes by a dry method, for example by making the electrodes vibrate or even by the mechanical friction from brushes on their surface.

In the second category of the so-called wet electrostatic collectors, the particles captured on the collection electrodes are evacuated by flushing them with water.

In the third category of the so-called semi-wet electrostatic collectors, water vapor is introduced into the chamber containing the discharge electrode or upstream thereof. The particles in suspension in the air then grow by heterogeneous nucleation to form droplets and said droplets are precipitated on the counter-electrode by the electrical force. The vapor introduced can also condense on the walls and thus result in a runoff on the collection electrode which contributes to the evacuation of the captured particles.

The prior solutions are not necessarily satisfactory for the following reasons:
- they are not always suitable for being performed and used in the form of a portable and compact device;
- they often require human intervention and are not necessarily easy to automate, whether at the collection level or the analysis level;
- they are not necessarily totally autonomous.

The publication referenced "Hyeong Rae Kim, Sanggwon An, and Jungho Hwang, *Aerosol-to-Hydrosol Sampling and Simultaneous Enrichment of Airborne Bacteria For Rapid Biosensing, ACS Sens.* 2020, 5, 2763-2771" describes an electrostatic collector intended to collect bioparticles in a flow of air. The air flow is injected into a channel and passes between two electrodes. The particles are attracted toward the collection electrode. A liquid is injected continuously to elute the particles captured on the collection electrode. This solution notably requires a continuous flow of liquid to elute the particles present on the collection electrode, which makes the solution ill-suited to be easily transportable and autonomous.

Moreover, it has been found that it was necessary to make sure to be careful in choosing the materials used for the collection of the particles, notably in the case of subsequent analysis performed on the collected particles. All the materials employed must in fact meet the criteria of compatibility with the various biological analysis techniques, which makes their choice not trivial.

Patent EP1112124B1 describes, for example, a collection membrane intended to be employed in an electrostatic collector that can be dry or wet. This document proposes different membrane compositions. It describes the use of a membrane made of interleaved fibers which can be made of ceramic, of metals or of metal alloys, or of carbon.

The technical solution described in this patent is interesting but its implementation in a collector of airborne particles for the purpose of biological analyses poses a certain number of problems. It is for example known that many metals, like aluminum for example, tend to inhibit the biomolecular analyses. Metals such as copper have disinfectant properties, which makes it unusable in the biological culture field.

One interesting solution is to use non-metallic conductive materials such as carbon or such as polymers, provided that they are conductive and that their components do not interact with the biological analysis reactions. The materials based on PEDOT (poly(3,4-ethylenedioxythiophene), well known in the state of the art, could be of interest but their use for biological analyses proves to be more complicated than expected. In fact, to be usable in a collector intended for biological analyses, the solvents employed in their preparation must be eliminated by specific methods.

Finally, the materials based on carbon and conductive polymers such as PEDOT:PSS are too hydrophobic and do not make it possible to ensure that the rinsing solution penetrates sufficiently into the membrane.

The silicone matrix described in the abovementioned patent EP1112124B1 is also intrinsically hydrophobic. While rinsing with water is always possible to clean the membrane regardless of whether its material is hydrophilic or not, another problem stems from the quantity of water necessary for biological analyses. In this context, the volumes must in fact be minimized and if possible less than 5 ml with a preferred volume of less than 300 $\mu$l/cm$^2$.

It will be understood from the above that the aim of the invention to have a device for collecting and analyzing airborne particles which:
- can operate dry to avoid the presence of water during the electrostatic discharges, likely to form numerous highly reactive species such as ozone. Now ozone, in the presence of an aqueous solution, leads to the formation of hydrogen peroxide which could affect the targets to be detected and inhibit the analysis reactions performed subsequently;

uses collection materials that are biocompatible and suited to subsequent analyses;

uses a composition that is sufficiently hydrophilic to facilitate the elution;

uses low volumes of water in the elution;

is easy to transport and deploy and is autonomous.

The solution will notably be able to allow tests to be strung together automatically. It will be able to be particularly compact and, advantageously, quiet enough to be employed in the form of autonomous beacons deployed in critical environments, for example in a hospital environment.

The device will advantageously be able to take the form of a consumable element, easy to deploy and to replace after a collection and analysis cycle.

SUMMARY OF THE INVENTION

This aim is achieved by a collection and analysis device comprising a one-piece component incorporating a unit for collecting particles and a unit for analyzing the collected particles, the collection unit comprising a collection zone disposed on the component, on which said particles are deposited, collection means configured to force said particles to be deposited against the collection zone, a fluidic elution circuit arranged in said component to elute the particles present in the collection zone, the device being characterized in that:

the collection means comprise at least one collection channel produced in the component and comprising an inlet and an outlet to be passed through by a flow of the gas or gas mixture containing the particles, said collection channel being arranged to pass through said collection zone, the collection zone is produced in a hydrophilic material, the fluidic elution circuit comprises a first fluidic channel emerging on the collection zone, the analysis unit comprises a detection chamber incorporated in said component, and arranged to collect a liquid drained by the collection zone during the elution.

The device of the invention performs a dry collection of the particles in a collection step performed in the component. An elution step performed in the same component follows the collection step to elute the particles intended for the analysis unit. The analysis step is then conducted, still in the same component.

According to a preferred embodiment, the collection zone is produced on an independent membrane produced in said hydrophilic material, deposited on a surface of the component.

According to a particular feature, the membrane is produced in a material based on cellulose or in a material of fabric type.

According to a particular embodiment, the collection means are of electrostatic type and comprise a discharge electrode and a collection electrode, the membrane being treated to be made electrically conductive and form said collection electrode.

According to another particular feature, the membrane is arranged to at least partially carpet the inner wall of the collection channel.

According to another particular feature, the discharge electrode is formed by a tip extending in the axis of said collection channel.

According to another particular feature, the collection zone is covered with a water-soluble material.

According to another particular embodiment, the collection means comprise a unit for generating a flow of the gas or gas mixture and the membrane is arranged in a plane transversal to the flow of gas or gas mixture to trap the particles.

According to another particular embodiment, the collection means comprise a unit for generating a flow of the gas or gas mixture through a nozzle and the membrane is arranged facing the nozzle to collect the particles by impaction.

The invention relates also to a method for collecting and analyzing particles present in an aerosol, the method being implemented using the device as defined above, the method comprising:

a step of collection of the particles performed in the collection zone of said collection unit, a step of elution by injection of a liquid into the fluidic elution circuit, to elute the particles trapped in the collection zone during the collection step, a step of recovery of the liquid drained by the collection zone in the fluidic recovery unit, a step of analysis of the particles in the analysis unit.

The recovery can be performed in said receptacle and the analysis can be performed in said detection chamber, these steps being implemented in the same component.

BRIEF DESCRIPTION OF THE FIGURES

Other features and advantages will emerge from the detailed description which is given in light of the attached drawings in which.

In the attached figures, the collection step is referenced E1 and the step of recovery by elution is referenced E2.

DETAILED DESCRIPTION OF AT LEAST ONE EMBODIMENT

The invention aims to collect particles P present in an aerosol and, if necessary, analyze the particles thus collected.

The particles can be microparticles or nanoparticles present in the aerosol.

In a nonlimiting manner, the collection of the particles P can notably be performed in the ambient air or in the air breathed out by a living being. Hereinafter in the description, it will be considered that the collection of the particles is performed in the ambient air.

One of the objectives is to analyze the particles in order to detect the presence of a pathogenic agent or a trace of the presence thereof, by analysis of the collected particles.

The pathogenic agents sought can be, among others, microorganisms such as viruses, bacteria, fungal spores, toxins, mycotoxins, allergens, or any other harmful agent.

The analysis can consist in detecting the presence of DNA, RNA, proteins, elements making up the pathogenic agent, such as lipids or glucides, of one or more pathogenic agents present in the collected particles. The analysis can also consist in detecting molecules such as ATP or even sugars such as mannitol, arabitol and glucose which indicate the presence of microorganisms. The analysis can also relate to the detection of molecules such as allergens and mycotoxins.

As an example, the analysis method can be of biomolecular amplification type (for example of LAMP, RPA, PCR, and other such types) or of immunoenzymatic type (for example of ELISA type).

Figure 1:
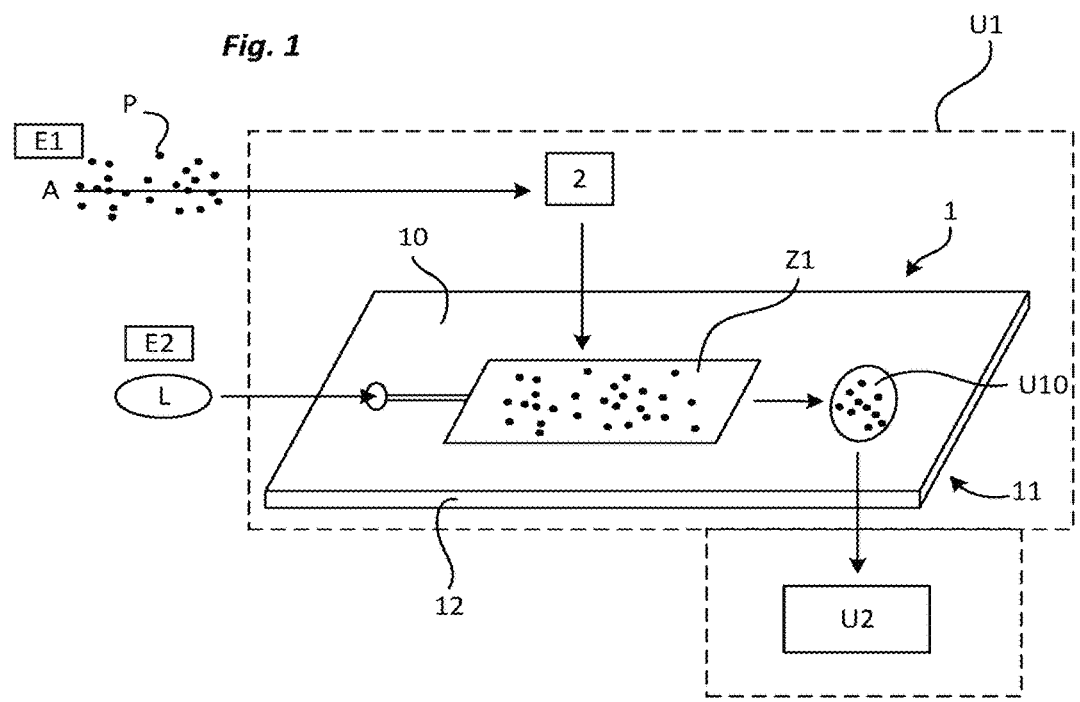
FIG. 1 schematically represents the collection device according to the invention and illustrates its principle of operation.
Figure 2A:
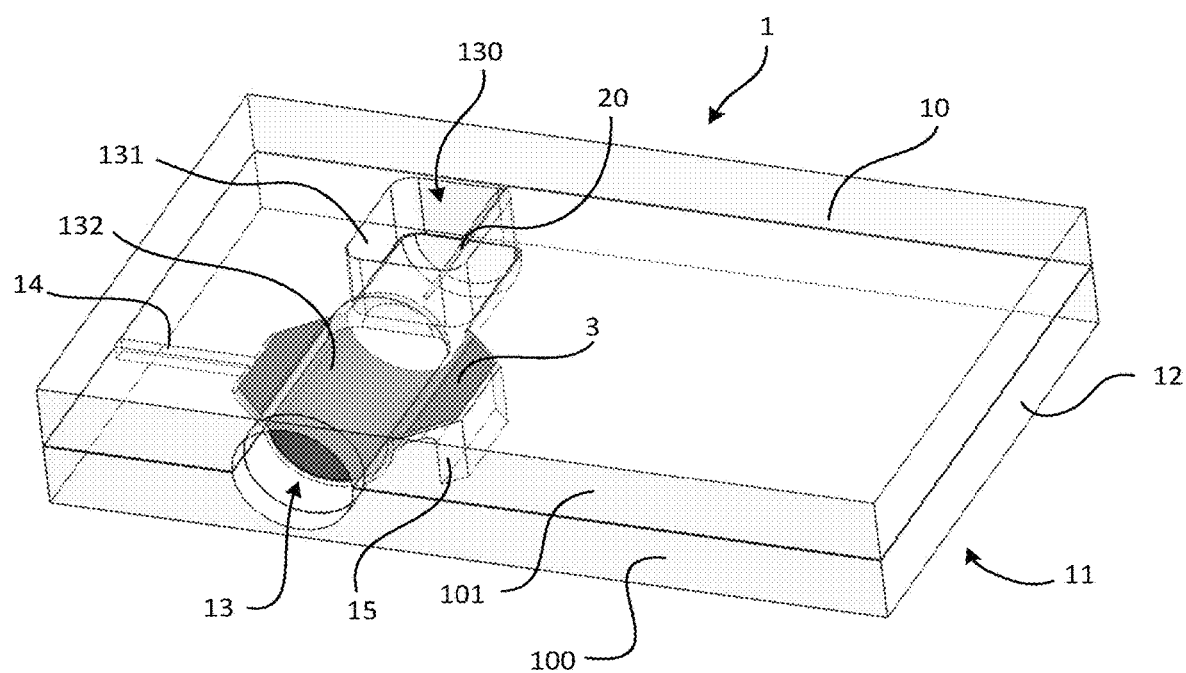
FIG. 2A and FIG. 2B represent a first embodiment of the collection device of the invention.
Figure 2B:
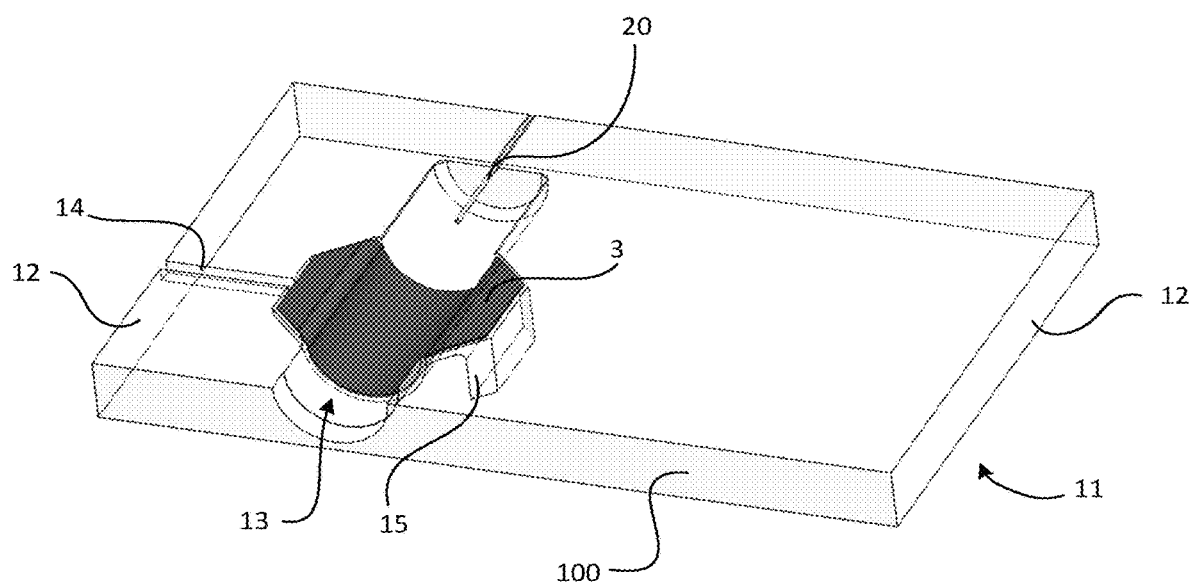
Figure 3A:
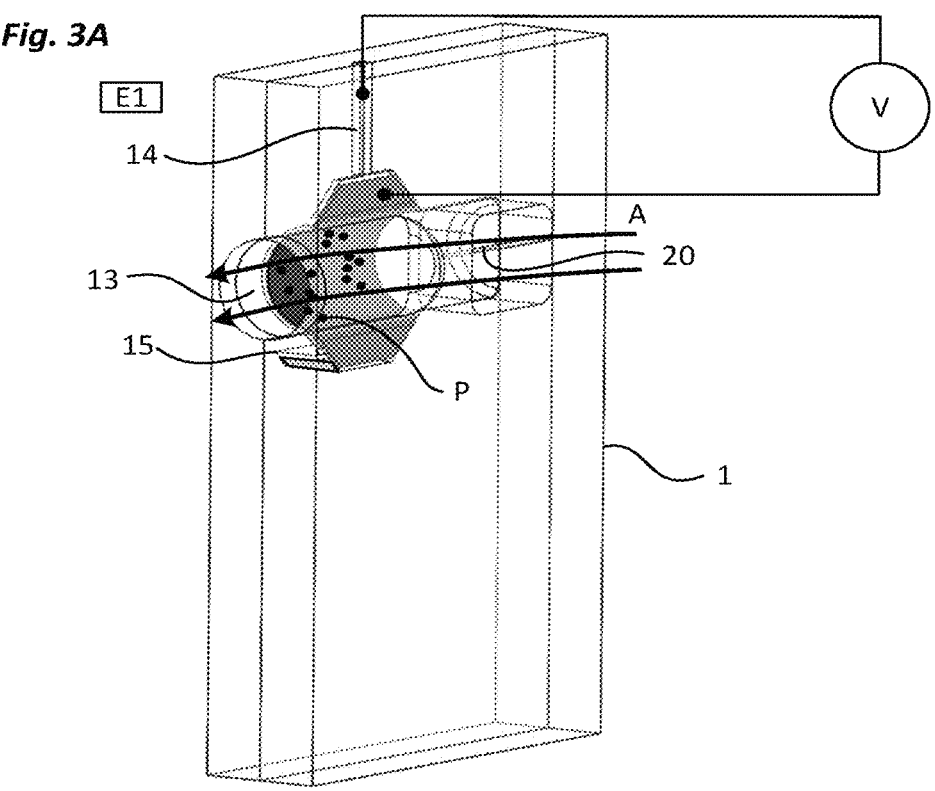
FIG. 3A and FIG. 3B illustrate the principle of operation of this first embodiment of the collection device of the invention.
Figure 3B:
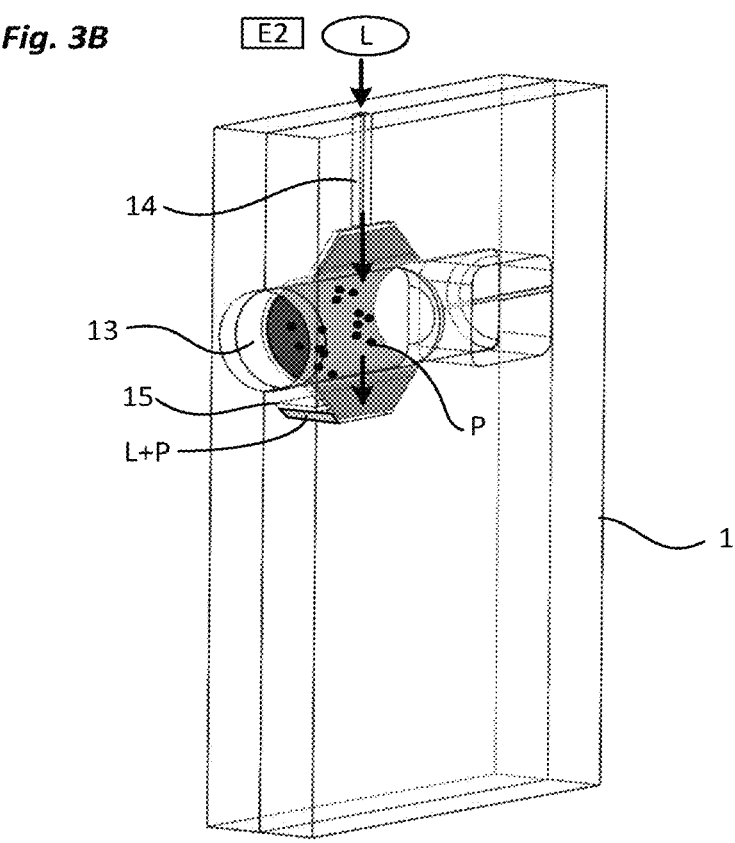
Figure 4A:
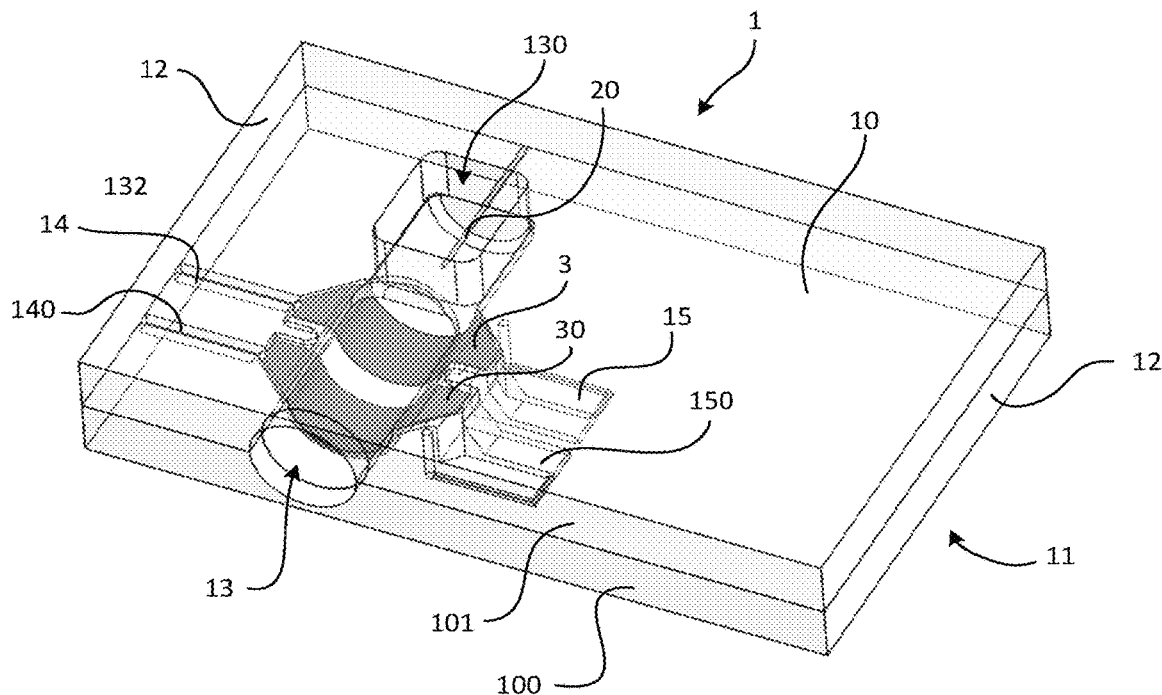
FIG. 4A and FIG. 4B represent a second embodiment of the collection device of the invention.
Figure 4B:
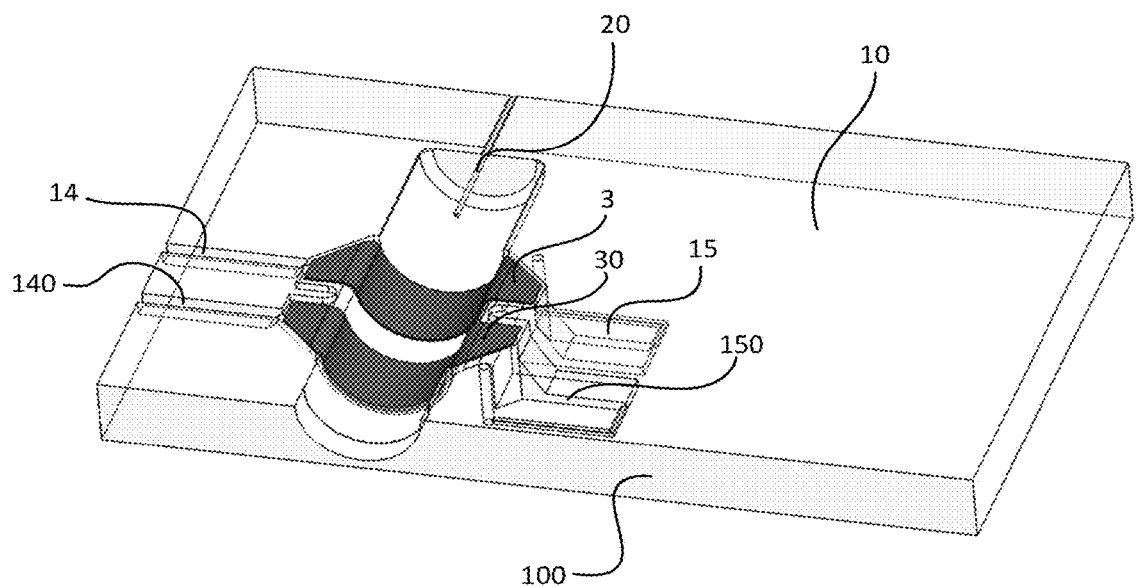

Referring to FIG. 1, the device for collecting and analyzing particles comprises a unit U1 for collecting particles and a unit U2 for analyzing the collected particles.

The device comprises a main collection component 1.

As an example, the collection component 1 can be produced in a material of COP/COC (cycloolefin polymer/cycloolefin copolymer) type, of polycarbonate or of PMMA (polymethyl methacrylate) type. It can notably have characteristics of transparency, sufficient for an optical read when the analysis is implemented directly in the component.

The component 1 can take the form of a parallelepipedal block, having a top face 10, a bottom face 11 and four lateral faces 12.

The collection unit U1 comprises a collection zone Z1 arranged on a dedicated wall of the component 1, on which the particles P are collected and collection means 2 configured to direct the particles present in the air toward its collection zone Z1.

In a nonlimiting manner, with reference to FIGS. 2A to 4B, the component 1 can be in two parts, a base 100 and a cap 101 which is added onto said base 100.

The component 1 can comprise an internal collection channel 13 through which the air to be analyzed circulates. The circulation of the air through the channel 13 can be forced (for example using a fan) or not.

The collection channel 13 can have an inlet 130 emerging on the top face 10 of the component 1 and an outlet emerging on one of the lateral faces 12 of the component 1. In a nonlimiting manner, the channel 13 can thus have a bent form with its inlet emerging in a well 131 hollowed out in said component 1, said well 131 being extended by a cylindrical main section 132 to the lateral outlet of the channel.

According to the invention, the collection zone Z1 is configured so as to have a hydrophilic character.

Hydrophilic character is understood to mean that the collection zone Z1 is capable of draining a liquid by capillarity. To recap, the wettability of a material is defined by observing the contact angle (most often denoted a) that the latter has with a drop of water. When this angle (also called contact angle, or angle of connection) is less than 90°, the surface is said to be more or less hydrophilic (the contact surface between the water and the material is high) and when it is greater than 90°, the surface is said to be more or less hydrophobic (the contact surface between the water and the material is small). In the case of the invention, hydrophilic character is understood to mean that the collection zone Z1 advantageously exhibits a contact angle less than 75° after a very short time less than a few seconds, for example 5 seconds. Moreover, for the collection zone Z1, this contact angle then decreases very rapidly to go below 40°, the water penetrating very rapidly into the material. It therefore exhibits a very hydrophilic character.

The collection zone Z1 can be formed by a microstructure fashioned in the accommodating wall of the component 1, for example by machining.

The collection zone Z1 is advantageously produced in the form of an independent membrane 3 manufactured in a hydrophilic material, this membrane being deposited on a particular surface of the component. Its hydrophilic character is understood to convey the sense that the membrane is capable of draining a liquid by capillarity, according to the definition given above.

The membrane 3 can be fixed to the component by any means, for example by bonding, for example using a double-sided adhesive.

The membrane 3 takes the form of a thin, flat and flexible substrate. The membrane 3 can be in the form of an elongate strip of material, extending between a first end and a second end in a longitudinal direction.

The membrane can notably be manufactured in a fibrous or cellular material, capable of draining a liquid. As an example, it can be produced in a material based on cellulose (for example filter paper or equivalent), in a material of fabric type of hydrophilic character, of foam (sponge) type or of glass fiber type. Materials that are not very hydrophilic or are nonhydrophilic, for example such as polyethylene, can also be made hydrophilic by a suitable treatment. They can thus be employed to manufacture the membrane.

As an example, the membrane 3 can have a length of 2 cm, a width of 2 cm and a thickness of 200 μm.

Advantageously, the collection zone Z1, advantageously the membrane 3 described above, can be covered with a water-soluble material to facilitate the recovery of the collected particles. As an example, it can be treated with a solution composed of a sugar such as lactose, trehalose or even saccharose which, by being dissolved in the elution, facilitates the driving of the particles collected by the elution solution.

To recover the particles trapped in the collection zone Z1, the invention consists in using the hydrophilic capabilities of the collection zone Z1, for example of the material of which the membrane 3 is composed when the membrane 3 is employed as collection zone Z1.

Hereinafter in the description, the collection zone Z1 is described as being formed by said membrane 3, but it should be understood that the principle applies for a collection zone Z1 generally, as described above, that notably exhibits the hydrophilic character defined above.

The component 1 also incorporates a fluidic circuit, called fluidic elution circuit. This fluidic elution circuit advantageously comprises a first fluidic channel 14.

The first fluidic channel 14 comprises an inlet, for example accessible on a lateral face 12 of the component (distinct from the collection channel 13 outlet lateral face), through which a liquid can be injected, for example water, and an outlet emerging on the collection zone Z1, in particular on the membrane 3.

The fluidic elution circuit also comprises a fluidic recovery unit U10 for the liquid drained by the membrane 3.

The fluidic recovery unit U10 for the liquid drained by the membrane 3 can comprise a receptacle 15 which is advantageously hollowed out in the component 1.

According to the invention, a liquid such as water is injected by the first channel 14 of the fluidic elution circuit.

By capillarity, the liquid ensures the wetting of the entire surface of the membrane 3 and drives with it the particles previously collected. The liquid drained by the membrane is recovered in the fluidic recovery unit U10, for example formed by the receptacle 15.

The receptacle 15 can be positioned directly under at least a part of the membrane to recover the injected liquid. The membrane can thus be applied directly against certain edges of the receptacle.

The fluidic recovery unit U10 for the liquid can also comprise a second channel, called outgoing channel, produced in the support. The outgoing channel can comprise an inlet situated in proximity to the membrane 3 to capture the liquid and an outlet emerging in said receptacle 15. The outgoing channel can be produced with a sufficient slope to facilitate the flow of the liquid to the receptacle.

Preferentially, the particle collection means 2 can comprise means of electrostatic type.

The electrostatic collection means comprise a so-called collection electrode (counter-electrode generally linked to the ground) and a discharge electrode 20. The collection electrode is disposed so as to form an electrostatic precipitator, by cooperating with the discharge electrode 20.

The discharge electrode 20 can be formed by a tip incorporated in the component and fixed by a first end in a wall of the component 1 and extending in a direction transversal to the axis of the well 131 to a free end positioned facing the inlet of the channel.

As an example, the tip can be made of steel or of stainless steel and formed by a capillary tube with an inner diameter of 250 μm and an outer diameter of 500 μm.

The collection electrode is advantageously produced by instrumenting the membrane 3 that is present. The material forming the membrane 3 is thus modified to become electrically conductive.

In this embodiment, the instrumented membrane is applied to at least partially carpet the inner wall of the cylindrical section of the collection channel 13. The membrane 3 can also comprise two opposing wings, each being housed in a suitable recess formed in the component, between its base 100 and its cap 101. Between its two ends, the membrane is disposed on the inner wall of the channel 13, transversely to the axis of the channel 13.

The first channel 14 is arranged to emerge on a first wing of the membrane and the recovery receptacle 15 for the liquid drained by the membrane 3 can be positioned under the second wing of the membrane, situated opposite its first wing. The first channel 14 is oriented in a direction parallel to the longitudinal direction of the membrane 3 and thus emerges at the first end of the membrane 3.

In this electrostatic collection mode, the membrane 3 which constitutes the collection electrode can be a cellulose membrane made conductive, for example by a treatment based on conductive polymer such as PEDOT (poly(3,4-ethylenedioxythiophene).

As an example, a conductive membrane can be manufactured as follows. A membrane of "Whatman 1" (registered trademark) type filter paper is washed in ethanol and in water then immersed in a solution of PEDOT/PSS (1.5-2% in the water) supplemented by 5% ethylene glycol. After draining, the paper is dried at 90° C. then a second layer of PEDOT is deposited by the same method. The conductivity of the polymer is then enhanced by soaking the membrane with dimethyl sulfoxide (with 2% water), by draining it and by drying it at 120° C. The membrane can then be washed in water at 80° C. for 15 minutes (3 times) and treated with albumin before being used for the collection.

When a potential difference is applied between the two electrodes, the electrostatic field thus created between the two electrodes generates a flow of ions from an ionized gas pocket surrounding the discharge electrode 20. This phenomenon is called corona discharge. The particles which are present between the two electrodes acquire electrical charges and thus become sensitive to the electrostatic field. They are precipitated by the electrical force onto the collection electrode formed by the membrane 3 and are deposited on the surface of the membrane 3.

The collection is performed by imposing a sufficiently high electrical potential difference between the two electrodes. As an example, the voltage employed is 8 kV to 10 kV. To stop the collection, a zero voltage is imposed between the two electrodes.

In FIG. 2A and FIG. 2B, the collection unit U1 comprises only a single membrane 3 and a single fluid recovery receptacle 15. When flat, the membrane 3 for example has a generally octagonal form, of which certain vertices are rounded to avoid the stress concentration effects.

Starting from the architecture of FIGS. 2A and 2B, FIGS. 3A and 3B illustrate the principle of collection of the particles P present in the air A, passing through the collection channel 13 (FIG. 3A—step E1) and of recovery of the particles P collected by the membrane 3 by elution (FIG. 3B—step E2). In the step E1, a potential difference is applied between the two electrodes by the generator V. The particles P present in the flow of air A are attracted to the collection electrode, formed by the membrane 3. In the step E2, the liquid L, for example water, is injected into the channel 14 and reaches the membrane 3. The liquid wets the membrane 3 and is drained by the membrane 3 to the receptacle 15, by eluting the particles P previously trapped by the membrane 3. In a nonlimiting and optional manner, once the particles are captured by the membrane 3, if this is not already the case, the component 1 can be positioned vertically, so as to orient the first fluidic channel 14 in a vertical direction, and above the membrane 3 and thus facilitate the elution of the particles by gravity. The receptacle 15 is then positioned under the membrane in the vertical direction.

FIG. 4A and FIG. 4B describe a variant embodiment in which the collection unit U1 comprises a second electrode, called reference electrode. This reference electrode can be formed by a membrane 30 identical to the membrane 3 employed for the collection, and positioned juxtaposed therewith, carpeting the bottom of the collection channel 13. The two membranes 3, 30 are of course not in contact with one another. A so-called reference independent fluidic circuit, incorporated in the component, is dedicated to it. This reference fluidic circuit can comprise a second channel 140 arranged in parallel with the first channel 14 and a second collection receptacle 150 placed in parallel with the first receptacle 15. In this embodiment, this second membrane 30 is not however linked to the electrical circuit and simply serves as reference with respect to the main circuit. The fluidic component 1 is fashioned so as to incorporate this reference fluidic circuit, in parallel with the fluidic elution circuit for the collected sample.

FIGS. 5A and 5B illustrate the principle of operation of the variant embodiment of FIGS. 4A and 4B.

In FIG. 5A, the electrical generator V is activated to launch the collection of the particles P present in the air (step E1), by creation of the potential difference between the discharge electrode and the collection electrode. The reference electrode is not however connected to the electrical circuit. During the collection, the air A is made to circulate through the collection channel and the particles P are attracted by the membrane 3 by electrostatic effect. The particles P present in the air are thus precipitated on the surface of the membrane.

Figure 5A:
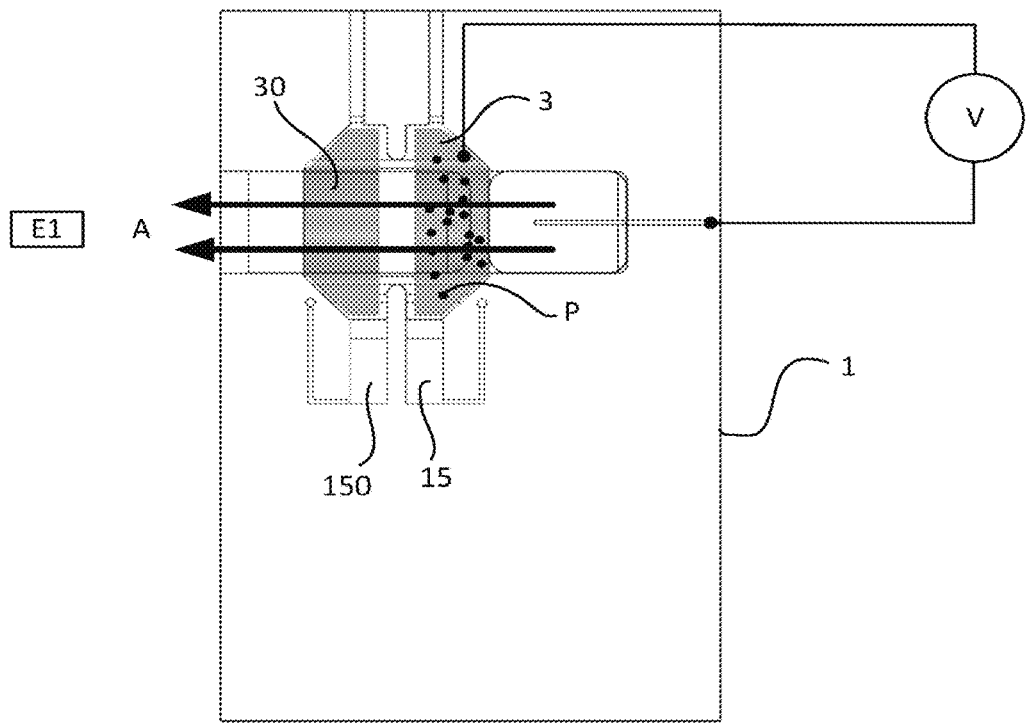
FIG. 5A and FIG. 5B illustrate the principle of this second embodiment of the collection device of the invention.
Figure 5B:
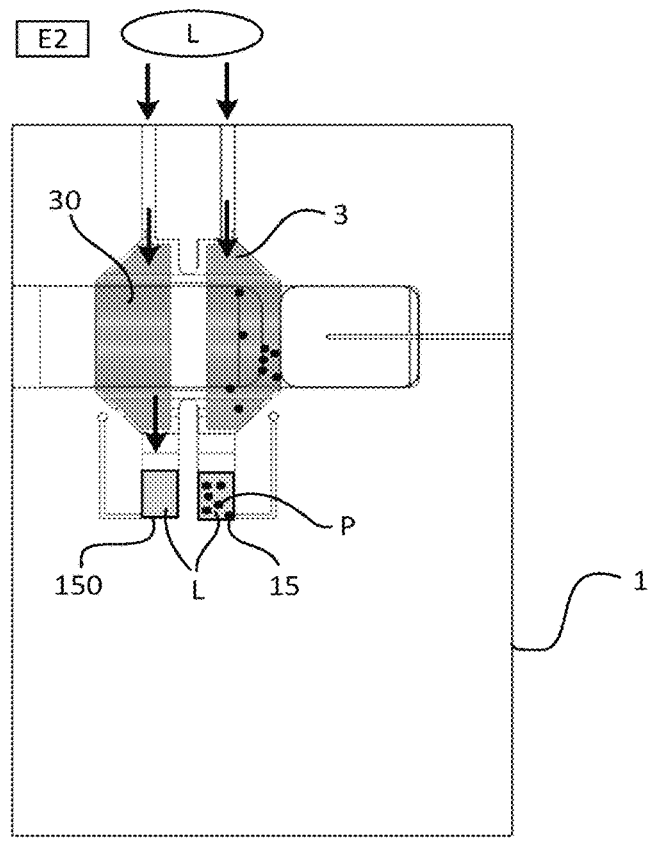

In FIG. 5B, once the particles P are collected on the membrane, the generator V is stopped and the second step consists in recovering the particles P trapped by the membrane 3 (step E2). To recover these particles P, a liquid L is injected into the first channel 14 of the fluidic elution circuit. The liquid L is also injected into the second channel 140, into the reference fluidic circuit.

The liquid injected into each fluidic circuit respectively wets the collection membrane 3 and the reference membrane 30. The liquid L is drained by each membrane 3, 30 and is then collected in each receptacle 15, 150. On the side of the fluidic elution circuit, the liquid drives the particles P which were trapped in the membrane 3 in the step E1.

After the wetting, if the particle or the biological material to be eluted is itself charged, an electrical field can be applied between two other electrodes in contact with the liquid solution so as to facilitate the elution of the analytes.

It should be noted that the collection on the membrane 3 and the recovery by elution of the material to be analyzed are performed in a desynchronized manner, that is to say not simultaneously. The wetting of the membrane 3 needs to take place in the absence of an electrical field between the discharge electrode and the collection electrode to avoid the formation of reactive species which could damage the biological material (notably the nucleic material). The electrical discharges employed in the electrostatic precipitators in fact produce numerous highly reactive species such as ozone. Now, ozone together with an aqueous solution leads to the formation of hydrogen peroxide which could affect the targets to be detected. The collection is therefore performed dry, the elution of the particles being performed in a second stage.

It should also be noted that, when the collection zone Z1 is produced in the form of a hydrophilic microstructure, fashioned in the component 1, the collection zone Z1 can be made conductive (in case of electrostatic collection), for example by application of a conductive material, for example by coating with a conductive paint, by vaporization of a conductive spray, by selective soaking, by application of a conductive thermoformable film, etc.

The unit U2 for analyzing the collected particles P is also implanted in the component 1 employed for the collection or can be separate from it. It is implanted in the component 1 to reduce the material that an operator would have to handle and to allow the process to be automated. The analysis unit U2 can comprise a detection chamber produced in the component 1 and intended to receive the sample collected after elution. This chamber can include reagents necessary to the analysis, for example to implement an amplification reaction. This detection chamber can be composed of the receptacle 15 present for the collection of the sample after elution or another receptacle communicating with the receptacle 15, via a fluidic channel. It should be noted that the elution liquid L, employed to elute the collected particles, can also include reagents necessary to the reaction. The reagents can be separated into two parts, a first part present in the elution liquid L and a second part present in the detection chamber.

The analysis can notably be performed directly in the receptacle 15 of the collection unit U1. The transparency characteristics of the material of which the component 1 is manufactured make it possible in fact to perform a detection by optical means. The sample to be analyzed can also be transferred into another chamber of the analysis unit U2, produced in the component 1 of the device, or even in a separate analysis unit arranged in a second independent component.

It should be noted that the component 1 thus incorporates, in a single block or element, all the means necessary for launching an analysis, that is to say the collection means and the analysis means, linked together.

As described previously, the analysis can be performed by biomolecular amplification or be of immunoenzymatic type (ELISA type).

An analysis by biomolecular amplification of microorganisms presupposes an extraction of the genomic material of the microorganisms. Three technical solutions can be implemented:

Driving the microorganisms with a first solution which wets the collection membrane, recovering them in the receptacle then lysing them mechanically or thermally or chemically in the latter or in another chamber of the device.

Wetting the membrane with a lyse solution which, by chemical pathway, extracts the genetic material of the microorganisms. The liquid then drives the genetic material of interest and this is recovered in the receptacle.

Heating the membrane to a temperature suited to the lysing of the microorganisms sought (for example, 65° C. for 5 minutes). The elution of the genetic material can then be performed in a second stage, to the receptacle.

Figure 6:
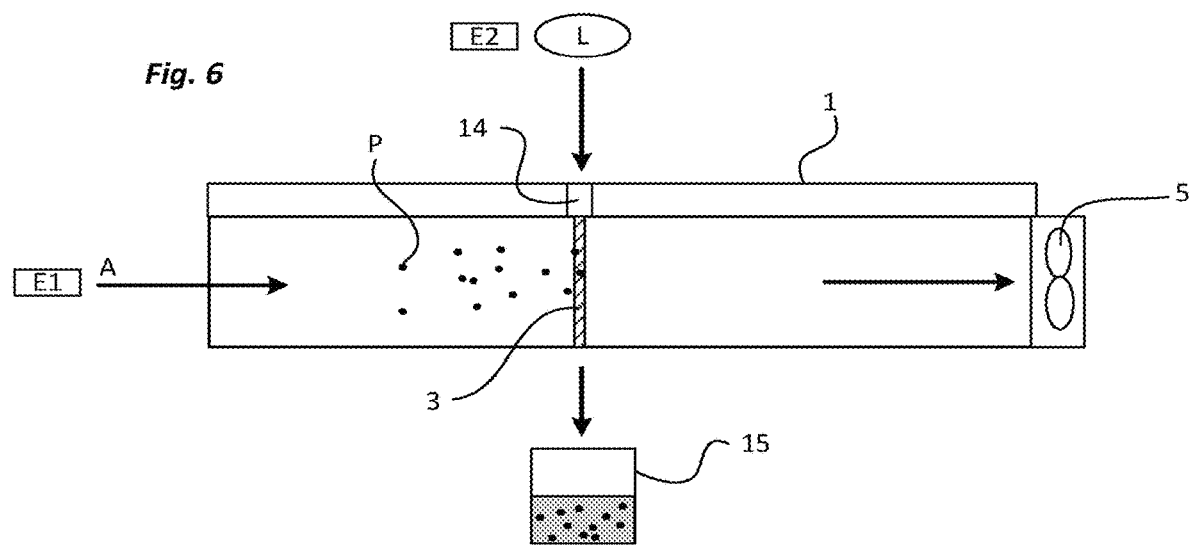
FIG. 6 represents another variant embodiment of the collection device of the invention.

According to a variant embodiment illustrated by FIG. 6, the collection means 2 can also comprise means for generating a flow of air directed toward the collection zone, also produced in the form of a membrane. These air flow generation means can comprise a fan 5.

The fan 5 is positioned to generate a flow of air A through the membrane 3, which is then arranged transversely to said air flow. The air flow passes through the membrane 3 and the particles P are retained by the membrane in the step E1. In this variant, the membrane 3 can be arranged in a plane transversal to the axis of the collection channel, in its main section. In the step E2, the liquid L is injected by the channel 14 to penetrate the membrane 3 and elute the particles P previously trapped thereby. As previously, the two steps E1 and E2 are not performed simultaneously, the collection taking place before the recovery by elution. In this variant embodiment, the mesh of the membrane 3 is of course designed to trap the targeted particles, present in the flow of air passing through it.

Figure 7:
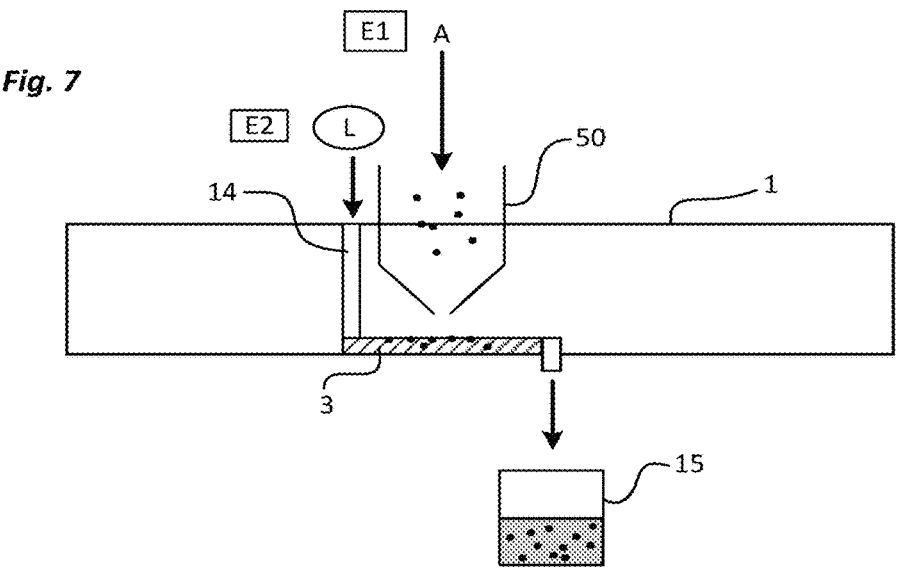
FIG. 7 represents another variant embodiment of the collection device of the invention.

In another variant embodiment illustrated by FIG. 7, the fan 5 can be positioned to generate the air flow A through a nozzle 50 whose outlet faces the membrane 3 to impact the particles P against the membrane 3. The system thus operates as an impactor. Once the particles P are trapped by the membrane in the step E1, the operation is then identical in step E2.

Since the component is advantageously autonomous, it can include a control unit responsible for controlling its various units.

The solution of the invention thus offers numerous advantages, including:

the production of a particularly compact and easily transportable collection unit;

the possibility of performing the collection and the analysis in the same component produced in a one-piece form;

a solution which can be entirely automated, both at the collection level but also at the analysis level;

a solution which makes it possible to collect a maximum of the collected particles, notably through the use of a membrane produced in a hydrophilic material.

The invention claimed is:

1. A collection and analysis device comprising:
a component incorporating a collection unit for particles and an analysis unit for analyzing the collected particles, the collection unit comprising a collection zone disposed on the component, on which said particles are deposited, collection means configured to force said particles to be deposited against the collection zone, a fluidic elution circuit arranged in said component to elute the particles present in the collection zone, and a control unit configured to control the collection unit and the fluidic elution circuit, wherein:
said control unit is programmed to control via a control sequence wherein said collection unit and fluidic elution circuit are controlled in a desynchronized manner in order to perform, in a first time, the collection of particles in a dry condition and, in a second time, the elution of the particles in a separate stage from the collection,
the collection means comprise at least one collection channel produced in the component and comprising an inlet and an outlet to be passed through by a flow of a gas or gas mixture containing the particles, said at least one collection channel being arranged to pass through said collection zone,
the collection zone is produced in a hydrophilic material,
the fluidic elution circuit comprises a first fluidic channel emerging on the collection zone,
the analysis unit comprises a detection chamber incorporated in said component, arranged to collect a liquid drained by the collection zone during the elution,
wherein the collection zone is produced in an independent membrane produced in said hydrophilic material, deposited on a surface of the component, and
wherein the component includes a receptacle positioned on an opposite side of the membrane from the first fluidic channel of the fluidic elution circuit.

2. The device as claimed in claim 1, wherein the membrane is produced in a material based on cellulose.

3. The device as claimed in claim 1, wherein the membrane is produced in a material of fabric type.

4. The device as claimed in claim 1, wherein the collection means are of electrostatic type and comprise a discharge electrode and a collection electrode, and wherein the membrane is treated to be made electrically conductive and form said collection electrode.

5. The device as claimed in claim 4, wherein the membrane is arranged to at least partially carpet an inner wall of the collection channel.

6. The device as claimed in claim 4, wherein the discharge electrode is formed by a tip extending in a longitudinal axis of said collection channel.

7. The device as claimed in claim 1, wherein the collection zone is covered with a water-soluble material.

8. The device as claimed in claim 1, wherein the collection means comprise a unit for generating a flow of the gas or gas mixture in a direction and wherein the membrane is arranged in a plane transversal to the direction of the flow of gas or gas mixture to trap the particles.

9. The device as claimed in claim 1, wherein the collection means comprise a unit for generating a flow of the gas or gas mixture through a nozzle and wherein the membrane is arranged facing the nozzle to collect the particles by impaction.

10. The device as claimed in claim 1, wherein the detection chamber contains reagents suitable for implementing an analysis.

11. A method for collecting and analyzing particles present in an aerosol, wherein said method is implemented using the device as defined in claim 1 and wherein said method comprises:
a step of collection of the particles performed in the collection zone of said collection unit,
a step of elution by injection of a liquid into the fluidic elution circuit, to elute the particles trapped in the collection zone during the collection step,
a step of recovery of the liquid drained by the collection zone in a fluidic recovering unit,
a step of analysis of the particles in the analysis unit.

12. The device as claimed in claim 1, wherein the receptacle is positioned directly under at least part of the membrane.

13. A collection and analysis device comprising:
a one-piece component incorporating a collection unit for particles and an analysis unit for analyzing the collected particles, the collection unit comprising a collection zone disposed on the component, on which said particles are deposited, collection means configured to force said particles to be deposited against the collection zone, a fluidic elution circuit arranged in said component to elute the particles present in the collection zone, wherein:
the collection means comprise at least one collection channel produced in the component and comprising an inlet and an outlet to be passed through by a flow of a gas or gas mixture containing the particles, said at least one collection channel being arranged to pass through said collection zone,
the collection zone is produced in a hydrophilic material,
the fluidic elution circuit comprises a first fluidic channel emerging on the collection zone,
the analysis unit comprises a detection chamber incorporated in said component, and arranged to collect a liquid drained by the collection zone during the elution,
the collection zone is produced in an independent membrane produced in said hydrophilic material, deposited on a surface of the component, and
the membrane is produced in a material based on cellulose.

* * * * *